United States Patent
Mangetsu

(10) Patent No.: US 7,894,366 B2
(45) Date of Patent: Feb. 22, 2011

(54) WIRELESS COMMUNICATION USING COMMUNICATION RATE BASED ON RADIO SIGNAL PROPAGATION CONDITION

(75) Inventor: Kenji Mangetsu, Shizuoka (JP)

(73) Assignee: NEC Access Technica, Ltd., Shizuoka (JP)

( * ) Notice: Subject to any disclaimer, the term of this patent is extended or adjusted under 35 U.S.C. 154(b) by 147 days.

(21) Appl. No.: 12/256,165

(22) Filed: Oct. 22, 2008

(65) Prior Publication Data

US 2009/0109867 A1 Apr. 30, 2009

(30) Foreign Application Priority Data

Oct. 25, 2007 (JP) ............................ 2007-277175

(51) Int. Cl.
*H04L 1/00* (2006.01)
(52) U.S. Cl. ...................... 370/252; 370/329; 370/468
(58) Field of Classification Search .................. 370/252
See application file for complete search history.

(56) References Cited

U.S. PATENT DOCUMENTS

2001/0050900 A1* 12/2001 Lee et al. .................... 370/232
2003/0139145 A1* 7/2003 Lee et al. ...................... 455/69

FOREIGN PATENT DOCUMENTS

| JP | 4-49742 A | 2/1992 |
| JP | 2004015783 A | 1/2004 |
| JP | 2004140544 A | 5/2004 |
| JP | 2004297118 A | 10/2004 |
| JP | 2005130053 A | 5/2005 |
| JP | 2005294997 A | 10/2005 |
| JP | 2006014001 A | 1/2006 |

OTHER PUBLICATIONS

Japanese Office Action for JP2007-277175 issued Aug. 5, 2009.

* cited by examiner

*Primary Examiner*—Huy D Vu
*Assistant Examiner*—Stephen J Clawson

(57) ABSTRACT

The wireless communication apparatus, which performs a wireless communication by using one of switchable communication rates, includes quality assurance level specifying means for specifying a quality assurance level that is the minimum communication rate for assuring transfer quality of a streaming data of specified transfer rate; communication rate setting control means for determining an initial setting value that is higher communication rate than the quality assurance level, setting the communication rate to the initial setting value when the communication is started, and changing a setting of the communication rate according to the communication state; and a transmission process unit for performing a modulation process of the streaming data according to the communication rate for transmitting the modulated streaming data.

16 Claims, 11 Drawing Sheets

DATA TABLE

| COMMUNICATION RATE | MAXIMUM TRANSFER RATE OF STREAMING DATA |
|---|---|
| 6 Mbps | 3 Mbps |
| 9 Mbps | 4 Mbps |
| 12 Mbps | 5 Mbps |
| 18 Mbps | 7 Mbps |
| 24 Mbps | 10 Mbps |
| 36 Mbps | 15 Mbps |
| 48 Mbps | 20 Mbps |
| 54 Mbps | 24 Mbps |

Fig.3

WIRELESS COMMUNICATION USING COMMUNICATION RATE BASED ON RADIO SIGNAL PROPAGATION CONDITION

This application is based upon and claims the benefit of priority from Japanese patent application No. 2007-277175, filed on Oct. 25, 2007 the disclosure of which is incorporated herein in its entirety by reference.

TECHNICAL FIELD

The present invention relates to a wireless communication apparatus provided with a rate adaptation function which selects one of specified communication rates for wireless data transmission according to a communication environment.

BACKGROUND ART

In a field of a wireless communication, the technologies for realizing a stable data communication by dynamically changing a communication rate depending on a communication environment such as a radio signal propagation condition have been disclosed. For example, Japanese Patent Application Laid-Open No. 2004-297118 discloses the technology which decreases a data error rate and decreases a delay in a data transmission by reducing the communication rate when a communication state is deteriorated. Japanese Patent Application Laid-Open No. 2005-294997 discloses the technology which increases the communication rate gradually when starting a packet transmission to a mobile station, and decreases the communication rate gradually when ending the packet transmission. The object of this is to prevent the degradation of the communication quality in other mobile stations, which are caused by an interference power, by suppressing a sudden change of the electric power generated by the packet transmission.

In a wireless LAN (Local Area Network), there are many factors which adversely affect the communication quality, such as not only obstacles existing in a radio signal propagation path but also communication interference by many access points and the like. In the wireless LAN, the rate adaptation function is incorporated, i.e., a plurality of communication rates are provided and the communication rates can be dynamically changed according to the communication environment.

Specifically, IEEE (The Institute of Electric and Electronics Engineers, Inc.) standardizes the standard for the wireless LAN such as IEEE802.11a, IEEE802.11b, IEEE802.11g and the like. For example, the IEEE802.11a standard specifies eight kinds of communication rates, that are 6 Mbps (Mega bit per second), 9 Mbps, 12 Mbps, 18 Mbps, 24 Mbps, 36 Mbps, 48 Mbps and 54 Mbps, as the communication rate available in a physical layer.

The above-mentioned communication rate (6 Mbps, 9 Mbps, 12 Mbps, 18 Mbps, 24 Mbps, 36 Mbps, 48 Mbps or 54 Mbps) is treated as an indicated rate which is only available as an instantaneous value of rate and communication is not always performed at these rates. An actual communication rate (effective rate) is lower than these rates caused by, for example, a process for an application program, an existence of overhead of a data-transfer protocol, and a waiting time process for transmitting and receiving a data frame that is peculiar to the wireless LAN, such as a DIFS (Distributed Coordination Function Inter-frame Space) and a SIFS (Short Inter-frame Space). Moreover, when a communication radio signal power is weakened due to a long hop between the wireless LAN equipments, obstacles existing in the radio signal propagation path, radio signal interference from other access points or the like, the effective rate becomes lower.

A wireless LAN system, which conforms to the IEEE802.11a standard, selects one of the eight available communication rates for a data transmission. When it is judged that the communication quality is improved and it becomes better communication state, the wireless LAN system controls to increase the communication rate by one step. On the other hand, when it is judged that the communication quality is deteriorated and it becomes worse communication state, the wireless LAN system controls to decrease the communication rate by one step. Thus, the wireless LAN system conforming to the IEEE802.11a standard optimizes the transmission efficiency by the rate adaptation function of the best effort type which changes the communication rate according to the communication state.

SUMMARY

An exemplary object of the present invention is to provide a wireless communication apparatus which realizes a comprehensively stable wireless communication by optimizing the data transfer efficiency depending on the radio signal propagation path condition while ensuring the data communication quality of data transmission having real-time behavior, which is exemplified by the streaming data of a video data distribution.

The wireless communication apparatus, which performs a wireless communication by using one of a plurality of switchable communication rates depending on a radio signal propagation condition, according to an exemplary aspect of the invention includes, quality assurance level specifying means for specifying a quality assurance level of the communication rate that is the minimum communication rate by which transfer quality of the wireless communication for a streaming data of specified transfer rate is assured; communication rate setting control means for determining through a test wireless communication an initial setting value of the communication rate that is higher communication rate than the quality assurance level, setting the communication rate to the initial setting value when the wireless communication is started for the streaming data, and changing a setting of the communication rate according to the radio signal propagation condition during the wireless communication by keeping the quality assurance level as the minimum communication rate; and a transmission process unit for performing a modulation process of the streaming data according to the communication rate that is set by the communication rate setting control means and transmitting the modulated streaming data.

The wireless communication method, in which a wireless communication is performed by using one of a plurality of switchable communication rates provided in a wireless communication apparatus depending on a radio signal propagation condition, according to an exemplary aspect of the invention includes, specifying a quality assurance level of the communication rate that is the minimum communication rate by which transfer quality of the wireless communication for a streaming data of specified transfer rate is assured; determining through a test wireless communication an initial setting value of the communication rate that is higher communication rate than the quality assurance level; setting the communication rate to the initial setting value when the wireless communication is started for the streaming data; and changing a setting of the communication rate according to the radio signal propagation condition during the wireless communication by keeping the quality assurance level as the minimum communication rate, wherein a signal of the streaming data is modulated according to the communication rate, and transmitting the modulated streaming data.

BRIEF DESCRIPTION OF THE DRAWINGS

Exemplary features and advantages of the present invention will become apparent from the following detailed description when taken with the accompanying drawings in which:

FIG. 3 is a data table showing an example of correspondence between a communication rate and a maximum transfer rate of a streaming data;

EXEMPLARY EMBODIMENT

Exemplary embodiments of the present invention will now be described in detail in accordance with the accompanying drawings.

Figure 1:
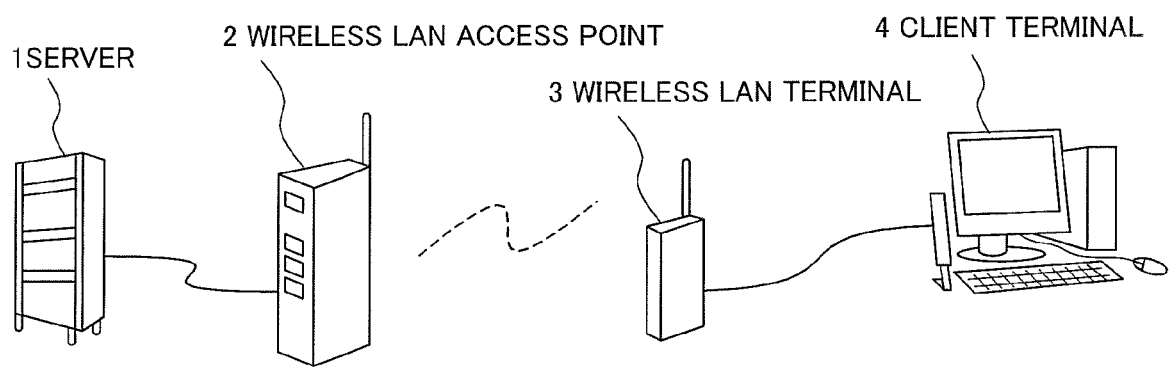
FIG. 1 is a figure showing a configuration of a wireless communication system of a first exemplary embodiment.

FIG. 1 is a figure showing a configuration of the wireless LAN system of the first exemplary embodiment. As shown in FIG. 1, the wireless LAN system includes a wireless LAN access point 2 that is connected to a server 1 and a wireless LAN terminal 3 that is connected to a client terminal 4.

The server 1 stores the data to be transmitted to the client terminal 4, and the server 1 is provided with control means of data communication protocols such as a FTP (File Transfer Protocol), a HTTP (Hyper Text Transfer Protocol), and a NetBIOS (Network Basic Input Output System) and a communication interface. The client terminal 4 acquires the data from the server 1 responding to an operation by a user, and the client terminal 4 is provided with control means of data communication protocols such as a FTP, a HTTP, and a NetBIOS and a communication interface. A wireless LAN access point (hereinafter, wireless access point) 2 and a wireless LAN terminal (hereinafter, wireless terminal) 3 are apparatuses which realize wireless LAN communication between the server 1 and the client terminal 4 by using radio channels. The wireless access point 2 is located in the server side and the wireless terminal 3 is located in the client terminal side.

Figure 2:
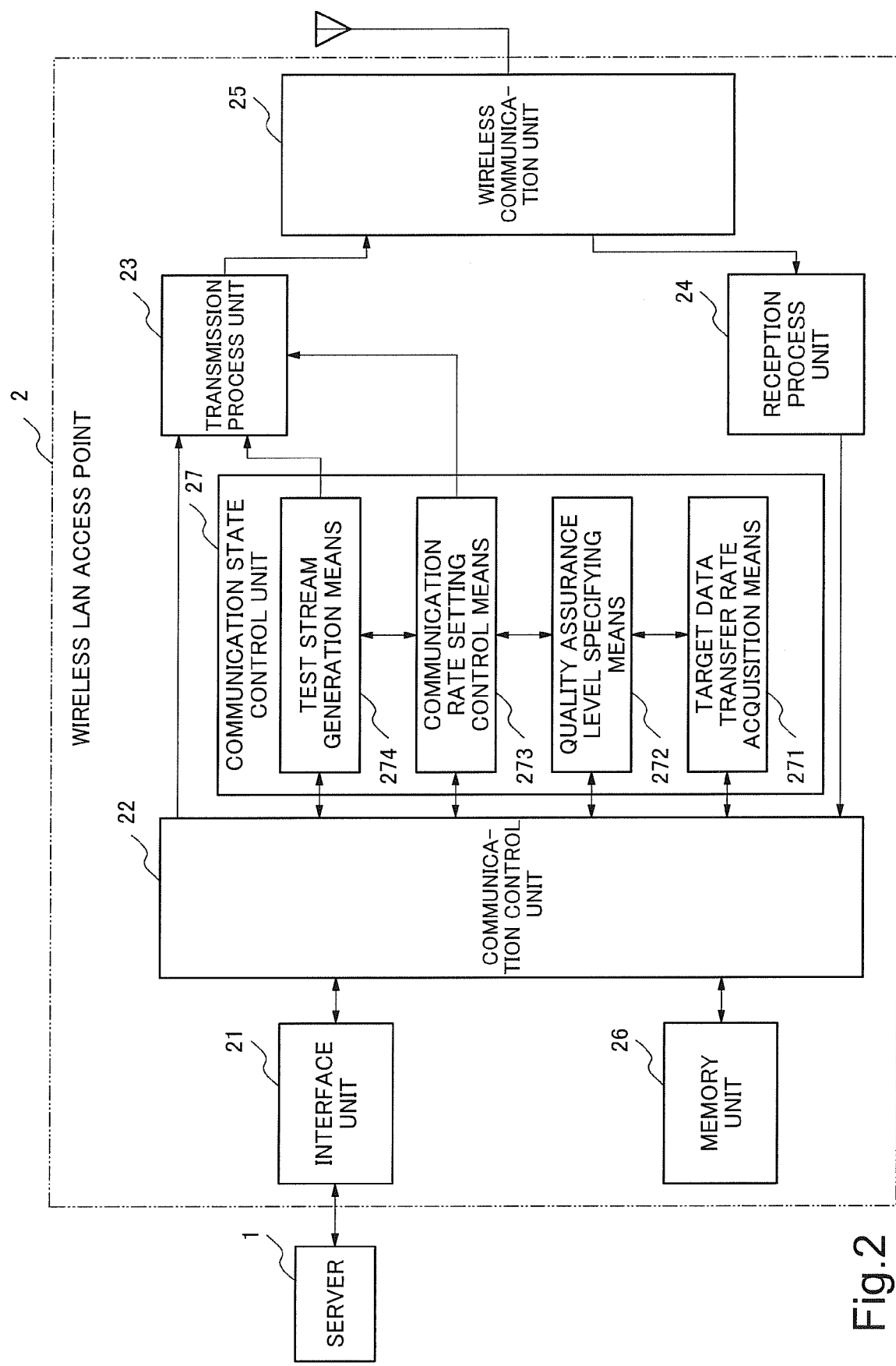
FIG. 2 is a block diagram showing a configuration of the wireless communication apparatus as a wireless access point according to the first exemplary embodiment shown in FIG. 1.

FIG. 2 is a block diagram showing a configuration of the wireless access point 2.

As shown in FIG. 2, the wireless access point 2 comprises the following units as a basic configuration: an interface unit 21 connected to the server 1; a communication control unit 22 which carries out various communication control processes among the server 1, the wireless access point 2 and the wireless terminal 3; a transmission process unit 23 which produces radio signals by modulating data signals to be transmitted to the wireless terminal 3; a reception process unit 24 which demodulates radio signals transmitted from the wireless terminal 3; a wireless communication unit 25 which connects to the wireless terminal 3 by radio channels and a memory unit 26 in which various data are recorded.

The wireless access point 2 further includes a communication state control unit 27 which controls optimization of the data transfer efficiency depending on the radio signal propagation condition while ensuring the data communication quality. The communication state control unit 27 comprises the following units: target data transfer rate acquisition means 271 for acquiring a transfer rate of the streaming data to be transmitted from the server to the user as a target data transfer rate; quality assurance level specifying means 272 for specifying the minimum level of the communication rate as the quality assurance level which can assure the transfer quality of the streaming data transmitted at the target data transfer rate; communication rate setting control means 273 for changing a setting of the communication rate of the wireless communication between the wireless terminal 3 and the wireless access point 2 according to the radio signal propagation condition; and test stream generation means 274 for generating a test streaming data having the same bit rate as the target data transfer rate and transmitting it to the wireless terminal 3. In other words, the target data transfer rate is the transfer rate of the streaming data expected by the user for stably being transmitted and received, and the quality assurance level is the minimum communication rate which can assure the transfer quality of the streaming data of the target data transfer rate.

The communication control unit 22 outputs the data signal received from the server 1 to the transmission process unit 23. On the other hand, when a reception signal is received from the reception process unit 24, the communication control unit 22 transmits an ACK response (Acknowledgement) to the wireless terminal 3 that is a transmission source of the reception signal via the transmission process unit 23 and the wireless communication unit 25.

The transmission process unit 23 modulates the data signal inputted from the communication control unit 22 by using the modulation method corresponding to the communication rate indicated by the communication rate setting control means 273 and transmits the radio signal to the wireless terminal 3 via the wireless communication unit 25. For example, in the configuration in accordance with the IEEE802.11a standard, eight kinds of communication rates that are 6 Mbps, 9 Mbps, 12 Mbps, 18 Mbps, 24 Mbps, 36 Mbps, 48 Mbps, and 54 Mbps are provided as the available communication rates and the data signal is modulated by using the modulation method corresponding to one of the communication rates selected by the communication rate setting control means 273.

The target rate acquisition means 271 acquires the target data transfer rate of the streaming data from outside whose transmission should be stably performed. For example, before performing a delivery of the streaming data from the server 1 to the client terminal 4, the transfer rate of the streaming data to be delivered may be acquired from the server 1 as the target data transfer rate.

The quality assurance level specifying means 272 specifies the quality assurance level which is the minimum communication rate for assuring the transfer quality of the streaming data of the target data transfer rate. For example, in the configuration conforming to the IEEE802.11a standard, a data table for selecting appropriate communication rate is provided in advance. FIG. 3 shows an example of the data table, and the data table may be stored in the memory unit 26. The data table contains corresponding information about each of communication rates available in the wireless communication apparatus and a maximum value of the transfer rate of the streaming data whose transfer quality can be theoretically ensured by each communication rate thereof. In FIG. 3, each of the communication rates available in the wireless communication apparatus is shown in a column of "COMMUNICATION RATE" and the maximum transfer rate of the streaming data corresponding to each communication rate is shown in a column of "MAXIMUM TRANSFER RATE OF STREAMING DATA". For example, if the communication rate is 24 Mbps, up to 10 Mbps of transfer rate of the streaming data can be applied. The data table is searched by using the transfer rate of the acquired target data transfer rate as an index key. Then, any of the communication rates which can theoretically ensure the transfer quality of the acquired target data transfer rate are selected among eight communication rates, and the lowest communication rate among the selected communication rates is determined as the quality assurance level. For example, if the acquired target data transfer rate is 8 Mbps, communication rates of 24 Mbps, 36 Mbps, 48 Mbps and 54 Mbps can support to transfer the target data transfer rate of 8 Mbps, and the lowest communication rate of 24 Mbps is determined as the quality assurance level.

Here, as is clear form above description, the value (bit rate) of the communication rate which can theoretically ensure the transfer quality of the streaming data transmitted at the target data transfer rate is greatly different from the value (bit rate) of the target data transfer rate. This is because, as mentioned above, the value of the communication rate in the wireless LAN is the indicated rate, which is only available as the instantaneous value of rate, and the communication is not always performed at this rate. In other words, by a process for an application program, an overhead of a data transfer protocol, a waiting time process for transmitting and receiving a data frame that is peculiar to the wireless LAN and the like, the effective rate that is the actual communication rate becomes a quite lower value than the indicated rate.

The communication rate setting control means 273 determines an initial setting value of the communication rate as described later. The initial setting value of the communication rate is the communication rate which is used when the data transmission is started, and the initial setting value is set to the value that is higher bit rate than the quality assurance level without having a communication error. During the data transmission, the setting of the communication rate is dynamically changed depending on the radio signal propagation condition. In other words, the communication rate setting control means 273 starts the data transmission at the initial setting value of the communication rate, then, changes the communication rate to the rate that is one step lower than the current rate when it detects continuous data non-delivery conditions (i.e., continuous communication errors) during the data communication and the number of times of the data non-delivery condition having been detected reaches the predetermined threshold value. In addition, whether or not the data is delivered is judged by whether or not the ACK response to the data transmission is received from the wireless terminal 3, i.e., the data non-delivery condition is detected when it receives a retransmission request. Moreover, the communication rate setting control means 273 cannot set the communication rate lower even if the number of times of the data non-delivery condition reaches the threshold value when the communication rate has already been lowered to the quality assurance level. In such a case, instead of setting the communication rate lower, the communication rate setting control means 273 increases the threshold value, i.e., a number of times of continuous occurrence of communication error to be counted is increased, and sets the communication rate to the initial setting value again.

In the wireless LAN communication, when the communication rate is set to a higher rate, the data transfer efficiency is improved but the communication is easily affected by noises. Therefore, in this exemplary embodiment, when the number of times of the communication error that continuously occurs reaches the threshold value, it is presumed that the radio signal propagation condition is aggravated and the communication rate is set to the rate that is one step lower than the current rate to secure accuracy of the data transfer.

Thus, when a communication environment is aggravated during the communication and the number of times of the retransmission request reaches the threshold value within a predetermined time, the communication rate setting control means 273 judges that it becomes difficult to stably perform the communication without changing the communication rate. The communication rate setting control means 273 decreases the communication rate step by step by up to the quality assurance level that is the minimum level of the communication rate for ensuring the transfer quality of the streaming data of the target data transfer rate. However, when the data non-delivery conditions have continuously occurred and the number of times of the data non-delivery condition reaches the threshold value under the condition in which the communication rate has already been lowered to the quality assurance level, the communication rate cannot be further decreased because the quality assurance level is the minimum level for theoretically ensuring the data transfer quality. If the communication rate is further decreased lower than the quality assurance level, the transfer quality of the streaming data of the target data transfer rate is no longer be secured. In this case, the threshold value of the number of times of the data non-delivery condition (the communication error) that continuously occurs is set to a larger value and the communication rate is restored to the initial setting value.

The test stream generation means 274 transmits a test streaming data in a preliminary step in which a transmission of the streaming data from the server 1 to the wireless terminal 3 is started. The test streaming data is used for determining the initial setting value of the communication rate. The test stream generation means 274 generates the test streaming data having the same bit rate as the target data transfer rate, and the test streaming data is transmitted at the communication rate of the quality assurance level to the wireless terminal 3 via the transmission process unit 23 and the wireless communication unit 25 as a test wireless communication. When the test streaming data is being transmitted in the test wireless communication, the communication rate setting control means 273 increases the communication rate step by step from the quality assurance level, and determines the communication rate of the initial setting value that is one step lower than the step in which the data non-delivery condition is detected. Thus, the communication of overall high transmission efficiency can be realized by setting the communication rate as large as possible from the initial stage of the communication.

While the data transmission is being performed with the quality assurance level of the communication rate, the communication rate setting control means 273 generates an alarm signal when the time spent for the retransmission process caused by the continuous data non-delivery conditions reaches a predetermined retransmission monitoring time. That is, when the communication rate is set to the quality assurance level and the communication is being performed, the transmission interval of the data is monitored. When the data cannot be transmitted for the predetermined period of time, it means that the quality of the communication path (i.e., the radio signal propagation path) cannot be secured and the data transmission is interrupted, and the communication rate setting control means 273 generates the alarm signal. In this case, the transmission interval of data is monitored based on the period until the ACK response is received after the data is transmitted in a wireless LAN layer.

After generating the alarm signal, either of countermeasures by setting the bit rate of the target data transfer rate to the lower value or by notifying a user to set the communication rate manually may be taken. Additionally, either of countermeasures by disconnecting the communication path with the wireless terminal 3 or by changing a communication mode to the best effort mode and continuing the communication may be taken. The reason why the alarm is generated is that it is necessary for users to consider the case of changing the setting of the server 1 itself.

By taking the configuration which conforms to the IEEE802.11a standard as an example, the operation of the communication rate setting control means 273 will be described with reference to FIGS. 4 to 7.

Figure 4:
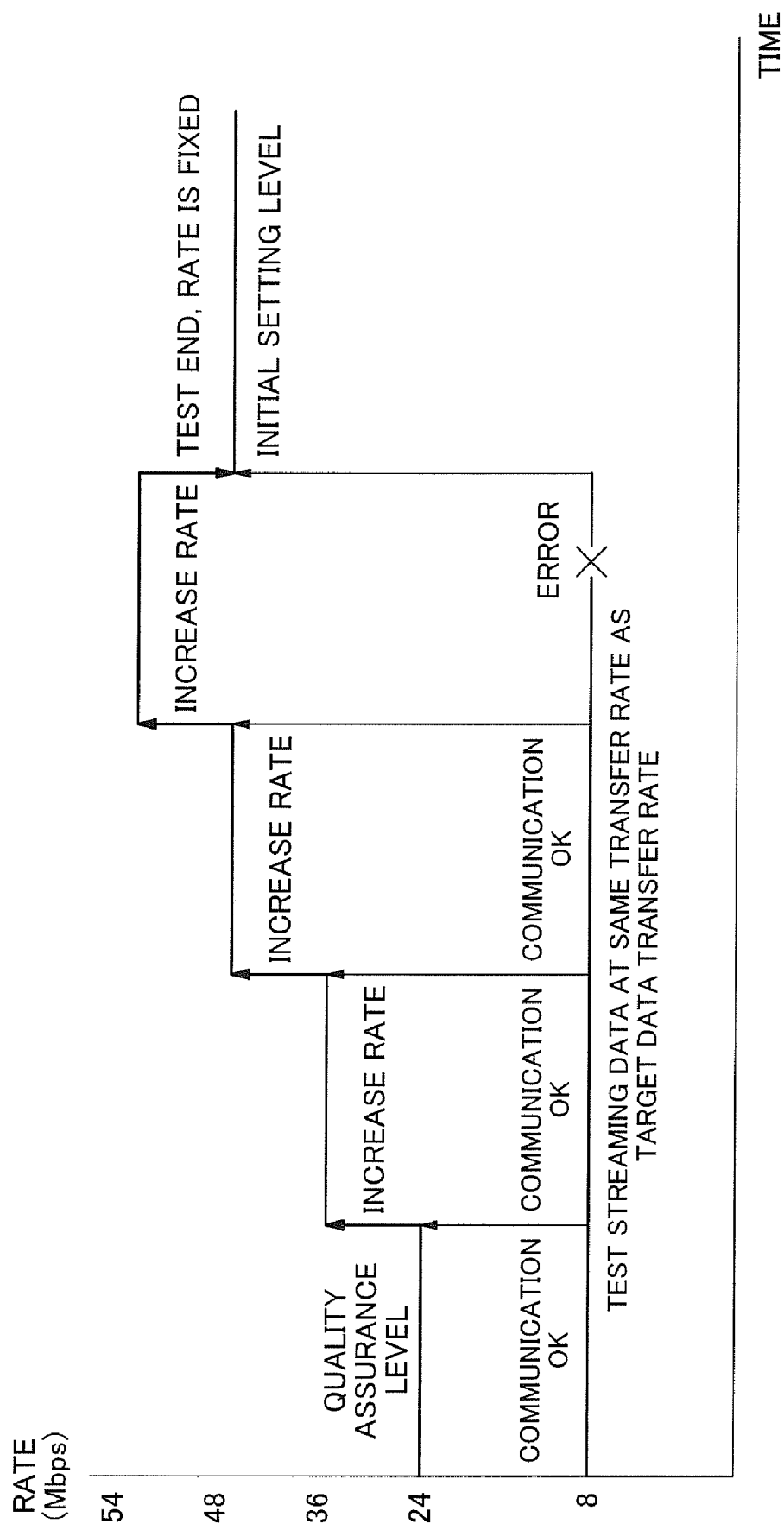
FIG. 4 is a figure illustrating an operation to specify an initial setting value of the communication rate in the first exemplary embodiment.

FIG. 4 is a figure illustrating the operation chart which explains how the initial setting value of the communication rate is determined in the first exemplary embodiment.

Just after establishing the link for connecting with the wireless terminal 3, the test stream generation means 274 generates the test streaming data at the same transfer rate as the target data transfer rate obtained by the target data transfer rate acquisition means 271 for transmitting the test streaming data to the wireless terminal 3. When a transmission of the test streaming data is started, the communication rate setting control means 273 sets the value of the communication rate to the quality assurance level specified by the quality assurance level specifying means 272. Then, the communication rate setting control means 273 confirms stability of communication in each communication rate by changing the communication rate from the quality assurance level to a higher communication rate in order by a step change basis. It can be confirmed that the communication is stable at a particular communication rate when the data non-delivery condition (communication error) does not occur within a predetermined fixed period of time in that communication rate. That is, the test streaming data is transmitted at the communication rate which is gradually increased in a step change basis from the quality assurance level to the maximum communication rate available in the wireless communication apparatus unless otherwise a communication error is detected within a predetermined fixed period of time.

For example, when it is required to stably transmit the streaming data whose target data transfer rate is 8 Mbps, the quality assurance level specifying means 272 specifies the communication rate of 24 Mbps as the quality assurance level that is the theoretical minimum communication rate for assuring the transfer quality of the streaming data of 8 Mbps by referring to the data table shown in FIG. 3. As shown in FIG. 4, the communication rate setting control means 273 increases the communication rate from 24 Mbps (the quality assurance level) to a higher rate in order while confirming the stability of the communication in each communication rate. During that period, the test streaming data corresponding to 8 Mbps is continuously flowed. When the data non-delivery condition (communication error) occurs, the transmission of the test streaming data is stopped. If the communication error occurs at the communication rate of 54 Mbps, the communication rate setting control means 273 determines that the initial setting value of the communication rate is 48 Mbps that is one step lower value than the communication rate of 54 Mbps, and the communication rate setting control means 273 starts the operation of the wireless communication at the communication rate of 48 Mbps (the initial setting value).

When the communication error occurred frequently in the transmission of the streaming data of the target data transfer rate at the communication rate of the initial setting value which has been set by the method mentioned above, the communication rate setting control means 273 judges that it has become a difficult condition to secure the stable communication at the communication rate of the initial setting value. In this case, the communication rate setting control means 273 performs the control for decreasing the communication rate step by step by up to the level which can satisfy to secure the communication quality. However, when it becomes difficult to secure the stable communication even if the communication rate is decreased by up to the quality assurance level, the communication rate setting control means 273 changes to increase the threshold value for judging the continuous communication errors and carries out the control for restoring the communication rate to the initial setting value.

Figure 5:
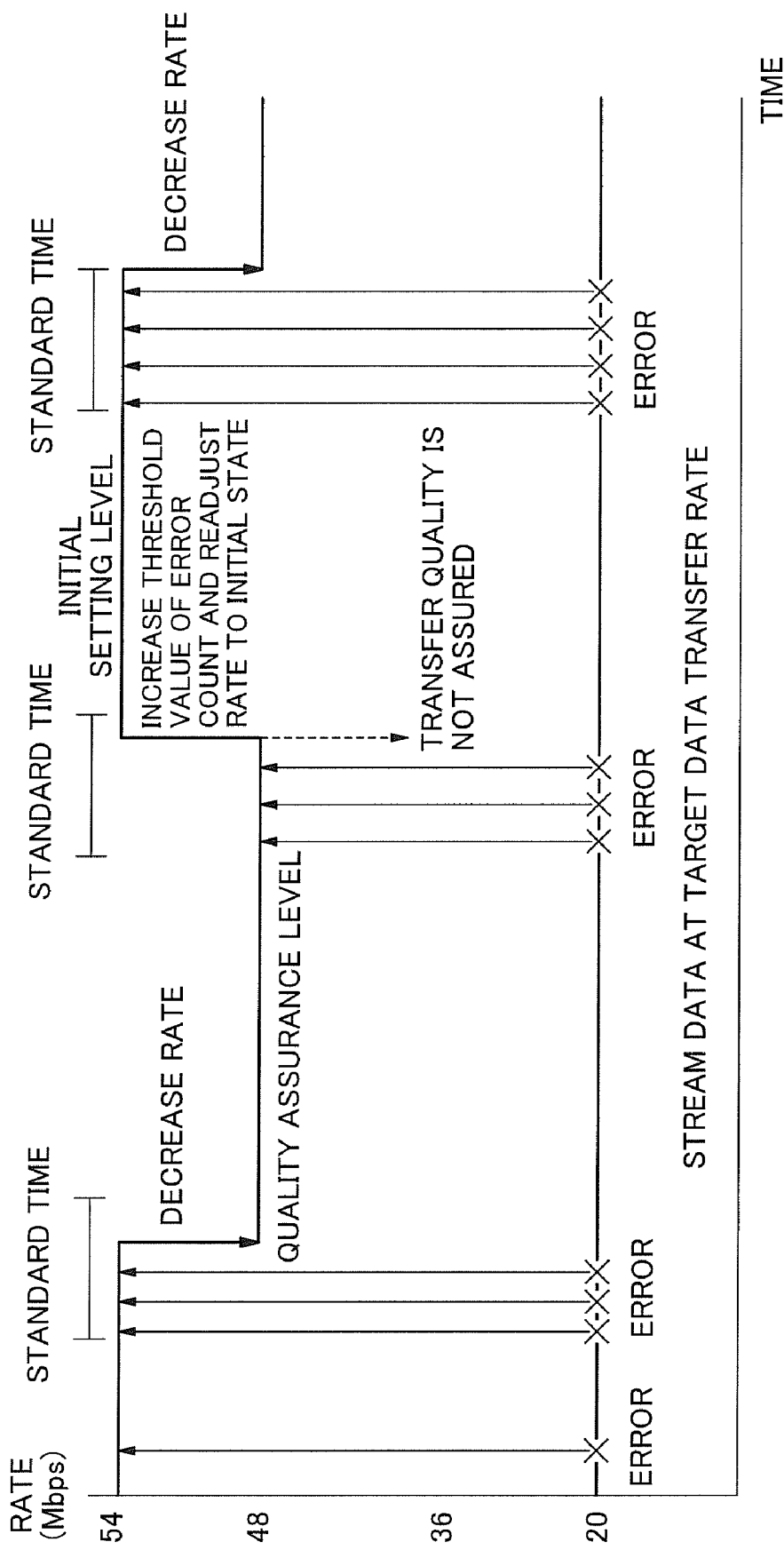
FIG. 5 is a figure illustrating an example of a setting control operation of the communication rate in the first exemplary embodiment.

FIG. 5 is a figure illustrating an example of a setting control operation of the communication rate that is performed by the communication rate setting control means 273 in the first exemplary embodiment.

FIG. 5 shows the case in which the communication rate is set to 54 Mbps as the initial setting value and the streaming data whose target data transfer rate is 20 Mbps is stably transmitted as an example. As the target data transfer rate is 20 Mbps, it has been determined that the quality assurance level of the communication rate is 48 Mbps (refer to FIG. 3). In this case, the threshold value of the number of error counts is predetermined as three (3).

When the communication is performed at the communication rate of 54 Mbps that is the initial setting value and when the error continuously occurs three times within a predetermined standard time, the communication rate setting control means 273 decreases the communication rate by up to 48 Mbps that is one step lower than the current communication rate to continue the communication. In this case, the communication rate of 48 Mbps is the quality assurance level that is the theoretical minimum communication rate for assuring the transfer quality of the streaming data whose target data transfer rate is 20 Mbps. When the communication is performed at the communication rate of 48 Mbps and when the error continuously occurs three times within a predetermined standard time, if the communication rate is decreased by up to 36 Mbps that is one step lower than the current communication rate, the transfer quality of the streaming data whose target data transfer rate is 20 Mbps cannot be ensured theoretically. Accordingly, the communication rate setting control means 273 increases the threshold value of the error count from three (3) to four (4), and restores the communication rate from 48 Mbps to 54 Mbps that is the initial setting value to continue the communication. When the communication is performed at the communication rate of 54 Mbps and when the error continuously occurs four times within a predetermined standard time, the communication rate setting control means 273 decreases the communication rate by up to 48 Mbps that is one step lower than the current communication rate to continue the communication. Thus, whenever stable communication cannot be maintained at the communication rate of 48 Mbps that is the quality assurance level, the communication rate setting control means 273 increments the threshold value by one (1) and resets the communication rate to the initial setting value of 54 Mbps.

Figure 6:
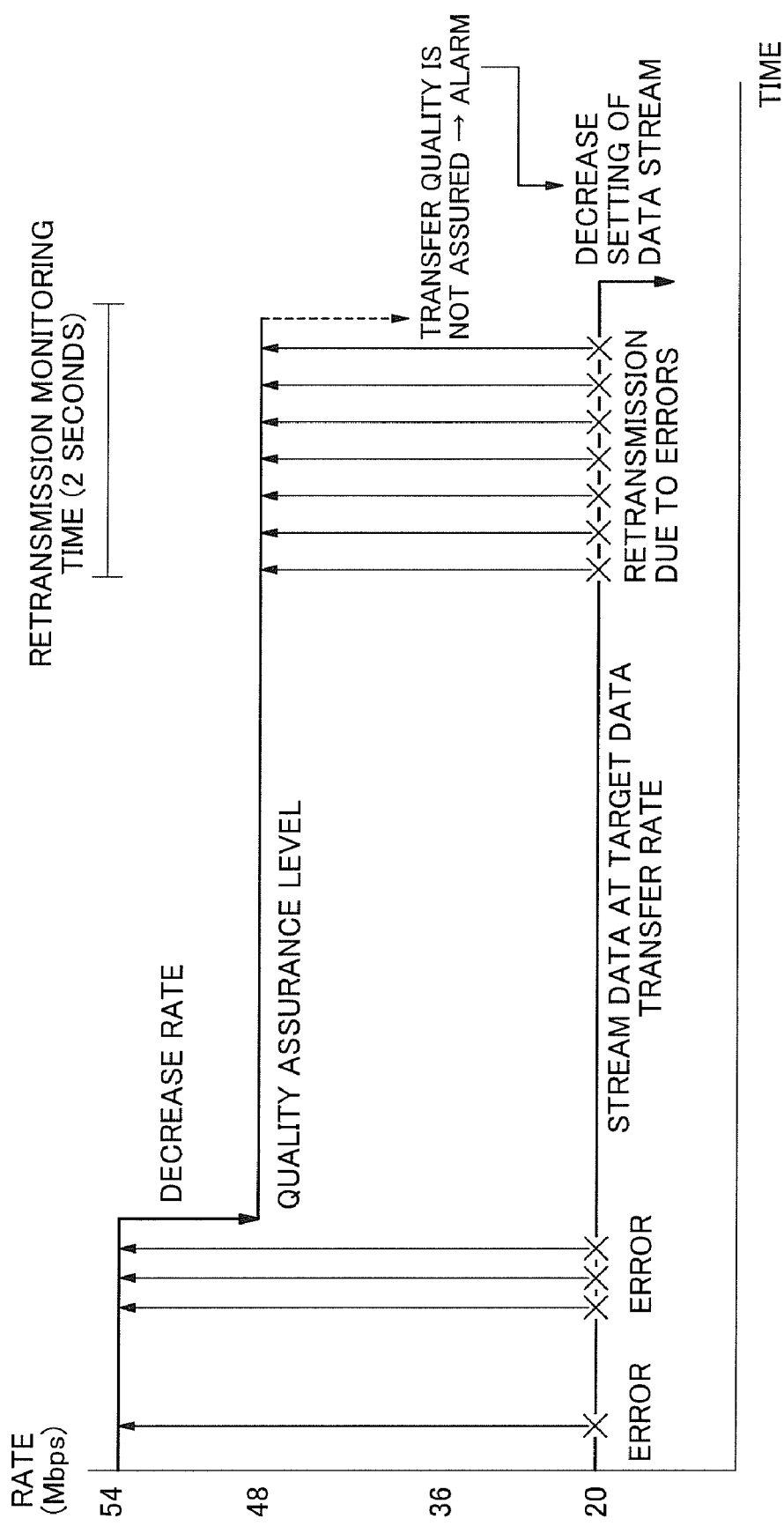
FIG. 6 is a figure illustrating another example of the setting control operation of the communication rate in the first exemplary embodiment.

FIG. 6 is a figure illustrating another example of the setting control operation of the communication rate that is performed by the communication rate setting control means 273 in the first exemplary embodiment.

The communication rate setting control means 273 monitors a transmission interval of data while the communication is being performed at the quality assurance level that is the theoretical minimum communication rate for assuring the transfer quality of the streaming data of the target data transfer rate. When the communication rate setting control means 273 detects that the data can not be transmitted within a predetermined fixed period of time (i.e., a retransmission monitoring time) because the communication error frequently occurs, the communication rate setting control means 273 generates an alarm. In other words, when quality of the communication path (i.e., the radio signal propagation path) cannot be secured to continue the data communication, an alarm is generated. As described in FIG. 6, whenever the data communication at the communication rate of the quality assurance level cannot assure the transfer quality, the threshold value of the communication error counter is incremented by one (1). However, it cannot increment endlessly because the time required for data retransmission due to consecutive errors which count up the error counter up to the incremented threshold value becomes long. Therefore, the retransmission monitoring time is specified in advance and when the time required for the data retransmission exceeds or equals to the retransmission monitoring time, it is judged that an abnormal state has occurred.

As shown in FIG. 6, for example, when the retransmission monitoring time is set to two (2) seconds and the time required for data retransmission due to errors continues for two seconds or more while the communication is being performed at the communication rate of 48 Mbps that is the quality assurance level, it is judged that the communication path for transmitting the streaming data has been disconnected and the communication rate setting control means 273 generates the alarm.

Figure 7:
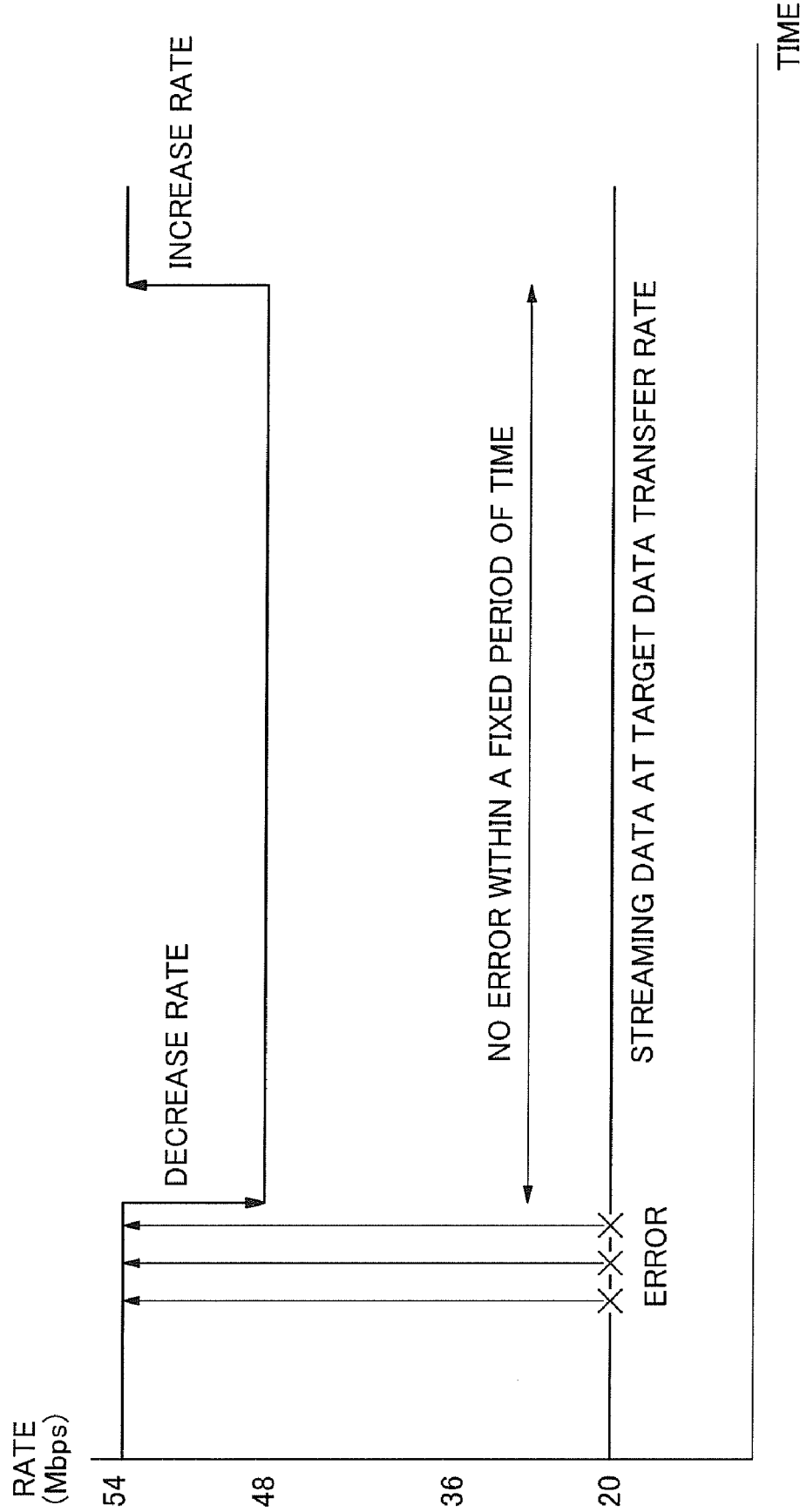
FIG. 7 is a figure illustrating further another example of the setting control operation of the communication rate in the first exemplary embodiment.

FIG. 7 is a figure illustrating further another example of a setting control operation of the communication rate that is performed by the communication rate setting control means 273 in the first exemplary embodiment.

As shown in FIG. 7, when the communication is performed at the lower communication rate than the communication rate of the initial setting value, the communication rate may be changed to one step higher level when no communication error (no data non-delivery condition) occurs within a predetermined fixed period of time. When the communication is performed at the communication rate of 54 Mbps that is the initial setting value, when the error continuously occurs three times within a predetermined standard time, the communication rate setting control means 273 decreases the communication rate by up to 48 Mbps that is one step lower than the current communication rate to continue the communication. When the communication is performed at the communication rate of 48 Mbps, when no communication error occurs within the predetermined fixed period of time and the communication is stably performed, the communication rate setting control means 273 can carry out the control for changing the communication rate to one step higher level than the current communication rate.

The function of the communication control unit 22, the transmission process unit 23, the reception process unit 24, the target data transfer rate acquisition means 271, the quality assurance level specifying means 272, the communication rate setting control means 273 or the test stream generation means 274 in the first exemplary embodiment described above, may be realized by a program executed by a computer.

Figure 8:
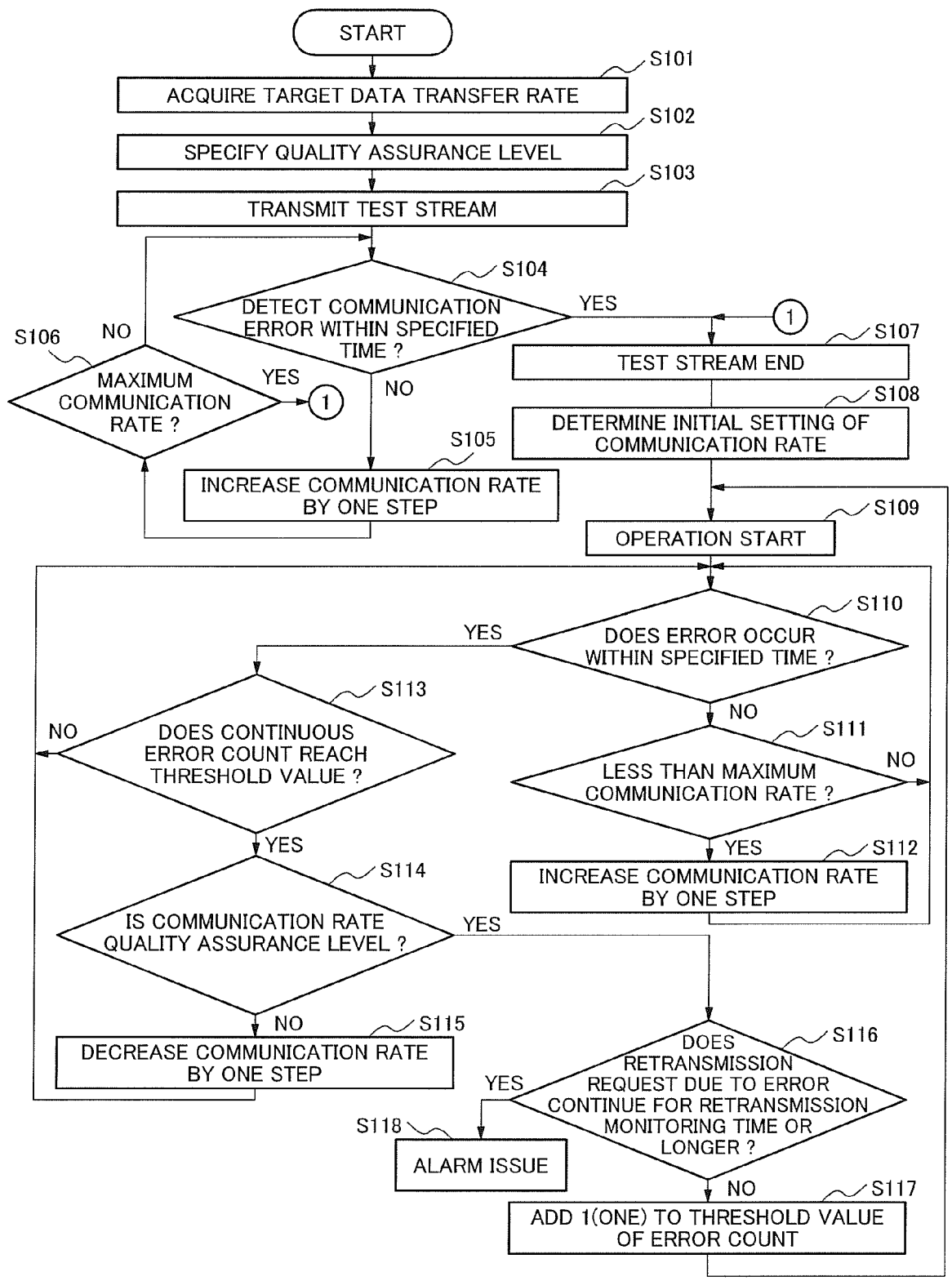
FIG. 8 is a flowchart showing an operation of the wireless communication apparatus as the wireless access point in the first exemplary embodiment shown in FIG. 1.

Next, the operation of the wireless access point 2 in the exemplary embodiment will be described with reference to FIG. 8. FIG. 8 is a flowchart which shows the operation of the wireless communication apparatus that is the wireless access point in the first exemplary embodiment disclosed in FIG. 1.

First, the communication control unit 22 controls the transmission process unit 23 and the reception process unit 24 to establish a wireless LAN communication link for connecting with the wireless terminal 3. The target data transfer rate acquisition means 271 acquires the target data transfer rate via the communication control unit 22 (s101), and the quality assurance level specifying means 272 specifies the quality assurance level of the communication rate based on this target data transfer rate with referring to the data table provided in advance whose example is shown in FIG. 3 (s102). The quality assurance level of the communication rate which has been specified by the quality assurance level specifying means 272 is stored in the communication rate setting control means 273.

The test stream generation means 274 generates the test streaming data at the same transfer rate as the target data transfer rate and transmits it to the wireless terminal 3 via the transmission process unit 23 at the communication rate of the quality assurance level (s103).

While the test streaming data is being transmitted at the communication rate of the quality assurance level, if no communication error is detected within a predetermined fixed period of time, the communication rate setting control means 273 increases the communication rate by one step (s105). When no communication error is detected within a specified time even in the state where the communication rate has been increased, the communication rate is further increased by one step. This operation is repeated.

At that time, if the communication rate reaches the maximum value of the communication rate that is provided in the wireless communication apparatus ("Yes" in s106), the transmission of the test streaming data is stopped (s107) and its communication rate is determined as the initial setting value (s108).

On the other hand, while the test streaming data is being transmitted at a certain communication rate, when a communication error is detected within the specified time, the transmission of the test streaming data is stopped (s107). The communication rate setting control means 273 determines the communication rate that is one step lower level than the communication rate at which the communication error is detected as the initial setting value (s108).

The communication rate setting control means 273 sets the communication rate to the determined initial setting value and starts to transmit the streaming data (s109). The communication rate setting control means 273 monitors whether or not the data non-delivery condition (communication error) occurs within a fixed period of time (s110). When no data non-delivery condition occurs within the fixed period of time and the communication rate is less than the maximum communication rate ("Yes" in s111), the communication rate setting control means 273 increases the communication rate by one step (s112).

On the other hand, when it is detected that continuous data non-delivery conditions (communication errors) occur and the number of times of the data non-delivery condition (consecutive error count) reaches the threshold value ("Yes" in s113), the communication rate setting control means 273 judges whether or not the communication rate is the quality assurance level at that time and if the communication rate is not the quality assurance level ("No" in s114), it changes the communication rate to one step lower level than the current communication rate (s115).

If the communication rate is the quality assurance level at the time when the consecutive error count reaches the threshold value ("Yes" in s114), it is judged whether or not the time required for the retransmission due to errors exceeds or equals to a retransmission monitoring time set in advance (s116). In this case, when it is judged that the time is within the retransmission monitoring time ("No" in s116), the threshold value of the error counter is incremented by one (1) (s117), and the communication rate is readjusted to the initial setting value and the communication is continued. Thus, when one (1) is added to the threshold value of the error counter successively, the time required for the retransmission due to consecutive errors becomes long. When the time required for the retransmission due to errors at the communication rate that is the quality assurance level exceeds or equals to the retransmission monitoring time ("Yes" in s116), the alarm signal is generated (s118). That is, when a continued time of repeated communication errors exceeds or equals to the predetermined retransmission monitoring time under the condition that the current communication rate is being set to the quality assurance level, the alarm signal is generated.

As described above, when transmitting the streaming data from the server 1 to the client terminal 4, the wireless communication apparatus of the first exemplary embodiment specifies the minimum communication rate as the quality assurance level among the communication rates which can secure the stable transmission of the streaming data, and sets the communication rate used for the actual transmission of the streaming data as higher as possible than the quality assurance level as the initial setting value. By this arrangement, the overall data transfer efficiency of the wireless communication apparatus of the first exemplary embodiment can be improved. With respect to a countermeasure for the communication being easily affected by noises or the like due to setting the communication rate to a higher level, the wireless communication apparatus of the first exemplary embodiment provides the error counter for counting the number of communication errors. When the number of communication errors reaches the threshold value due to a plurality of communication errors continuously having been occurred, the communication rate is changed to set to one step lower value than the current communication rate to secure the accurate data transfer.

Figure 9:
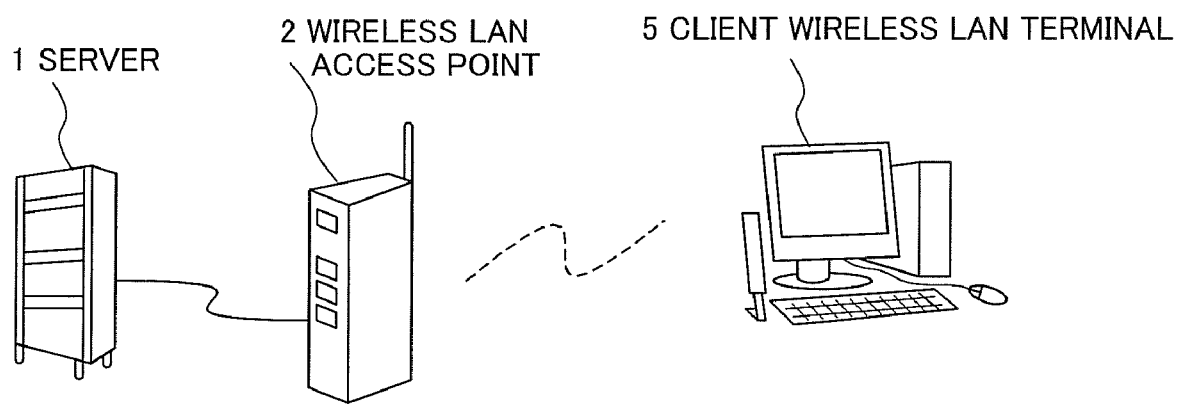
FIG. 9 is a figure showing a configuration of the wireless communication system according to a second exemplary embodiment.

FIG. 9 is a figure showing the configuration of the wireless communication system according to the second exemplary embodiment. In the wireless communication system of the second exemplary embodiment, a client with built-in wireless LAN terminal 5 has the function of the client terminal 4 and the function of the wireless terminal 3 of the first exemplary embodiment, and the wireless access point 2 cooperates with the server 1. The wireless access point 2 is controlled by a management function provided in the server 1.

Figure 10:
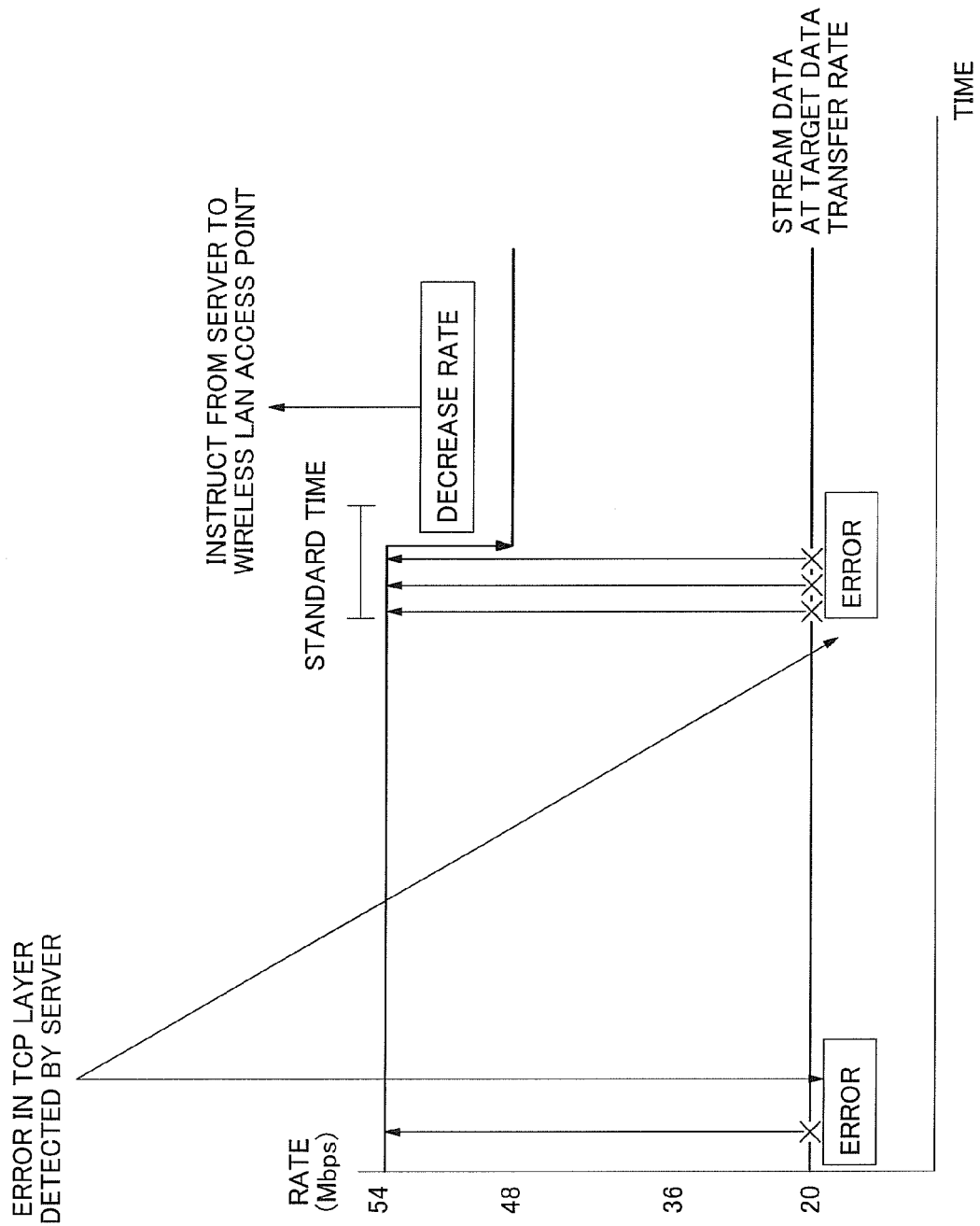
FIG. 10 is a figure illustrating an example of the setting control operation of the communication rate in the second exemplary embodiment.

FIG. 10 is a figure illustrating an example of the setting control operation of the communication rate in the wireless communication system according to the second exemplary embodiment.

In the second exemplary embodiment, the wireless access point 2 does not perform an error control and the server 1 performs the error control instead. In other words, the communication error is not monitored by the ACK response in the wireless LAN layer, but it is monitored by errors in the TCP layer. The communication rate to be used for the data transfer is determined and controlled by the management function of the server 1 and the determined communication rate is instructed to the wireless access point 2.

For example, the target data transfer rate acquisition means 271, the quality assurance level specifying means 272, the communication rate setting control means 273 and the test stream generation means 274 that are described in the first exemplary embodiment are provided in the server 1 and not provided in the wireless access point 2. In the wireless access point 2, the transmission process unit 23 modulates a transmission signal according to the instruction from the server 1.

Figure 11:
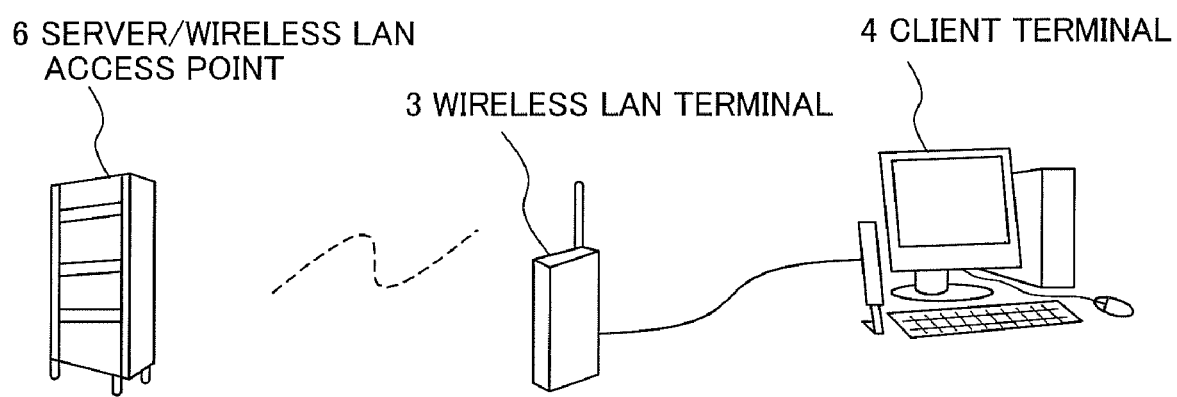
FIG. 11 is a figure showing a configuration of the wireless communication system according to a third exemplary embodiment.

FIG. 11 is a figure showing a configuration of a wireless communication system according to the third exemplary embodiment. In the third exemplary embodiment, the wireless access point 2 and the server 1 of the first exemplary embodiment are integrated into one unit (a server/wireless LAN access point 6). The server 1 includes various units of the wireless access point 2 described in FIG. 2 in which the target data transfer rate acquisition means 271, the quality assurance level specifying means 272, the communication rate setting control means 273 and the test stream generation means 274 are included. These are described in the first exemplary embodiment.

Accordingly, the server/wireless LAN access point 6 of the third exemplary embodiment can perform both the various controls described in the first exemplary embodiment and the error monitoring in the TCP layer described in the second exemplary embodiment.

The related art described in the background art causes a problem that the data transmission such as a large amount of streaming data having real-time behavior for a long time and continuous communication becomes unstable when the communication rate is dynamically changed during such a communication, because various settings for the data transmission traffic at an upper layer cannot follow the data transmission having real-time behavior, which is exemplified by the streaming data for a video data distribution.

An exemplary advantage of the wireless communication apparatus according to the invention is to realize a comprehensively stable wireless communication for a large amount of streaming data having real-time behavior by optimizing the data transfer efficiency according to the radio signal propagation path condition while ensuring the data communication quality of data transmission. That is, the wireless communication which is totally stable for the streaming data that requires a real time behavior can be realized by securing communication quality as well as optimizing data transfer efficiency. In the wireless communication apparatus according to the present invention, the minimum communication rate for securing the target streaming data is determined, and the setting control of the communication rate is performed by keeping the transfer quality and stability of the streaming data.

While this invention has been particularly shown and described with reference to exemplary embodiments thereof, the invention is not limited to those specific embodiments. It will be understood by those of ordinary skill in the art that various changes in form and details may be made therein without departing from the spirit and scope of the present invention as defined by the claims.

Further, it is the inventor's intention to retain all equivalents of the claimed invention even if the claims are amended during prosecution.

What is claimed is:

1. A wireless communication apparatus which performs a wireless communication for streaming data by using one of a plurality of switchable communication rates depending on a radio signal propagation condition, comprising:

a memory unit to store a data table including corresponding information about each of the communication rates within the wireless communication apparatus and a maximum data transfer rate of streaming data, the maximum data transfer rate having a transfer quality that is ensured by each of the communication rates;

a communication state control unit to control optimization of a data transfer efficiency based on the radio signal propagation condition, while ensuring the transfer quality, comprising:

a quality assurance level specifying unit to search the data table stored in the memory unit by using a specified target data transfer rate of the streaming data to be transmitted as an index key, to select one or more of the communication rates that ensure the transfer quality of the specified target transfer rate, and to specify a quality assurance level of the communication rate that is a lowest communication rate among the selected one or more communication rates;

a communication rate setting control unit to perform a test wireless communication in which test streaming data having a same data transfer rate as the specified target data transfer rate is transmitted at each of the one or more communication rates on a step change basis from the quality assurance level to a maximum communication rate available in the wireless communication apparatus unless a communication error is detected within a predetermined fixed period of time, the communication rate setting control unit to determine a one step lower communication rate as an initial value of the communication rate when the communication error is detected, the communication rate setting control unit is to determine the maximum communication rate as the initial value of the communication rate when no communication error is detected during the test wireless communication, the communication rate setting control unit is to set the communication rate to the initial value when the wireless communication is started for the streaming data, and is to change a setting of the communication rate according to the radio signal propagation condition during the wireless communication by keeping the quality assurance level as the minimum communication rate; and a transmission process unit to perform a modulation process of the streaming data according to the communication rate that is set by the communication state control unit and to transmit the modulated streaming data.

2. The wireless communication apparatus according to claim 1, wherein the communication rate setting control unit is further to adjust the communication rate during the wireless communication for the streaming data by decreasing a setting level of the communication rate whenever a number of times of continuous occurrence of the communication error detected reaches a threshold value that is set in advance.

3. The wireless communication apparatus according to claim 2, wherein the communication rate setting control unit is to increment a value of the threshold value and restores the communication rate to the initial setting value when the number of times of continuous occurrence of the communication error detected reaches the threshold value under a condition that a current communication rate is being set to the quality assurance level.

4. The wireless communication apparatus according to claim 3, wherein the communication rate setting control unit is to generate an alarm signal when a continued time of repeated communication errors exceeds or equals to a predetermined retransmission monitoring time under a condition that a current communication rate is being set to the quality assurance level.

5. The wireless communication apparatus according to claim 3, wherein the communication rate setting control unit is to increase a setting level of the communication rate when the communication rate is set to lower than the maximum level and the communication error is not detected within a predetermined period of time.

6. A wireless communication method in which a wireless communication is performed for streaming data by using one of a plurality of switchable communication rates provided in a wireless communication apparatus depending on a radio signal propagation condition, comprising:

searching a data table including corresponding information about each of the communication rates within the wireless communication apparatus and a maximum data transfer rate of streaming data, the maximum data transfer rate having a transfer quality that is ensured by each of the communication rates, the data table searched by using a specified target data transfer rate of the streaming data to be transmitted as an index key and by selecting one or more of the communication rates that ensure the transfer quality of the specified target transfer rate;

specifying a quality assurance level of the communication rate that is a lowest communication rate among the selected one or more communication rates;

performing a test wireless communication in which test streaming data having a same data transfer rate as the specified target data transfer rate is transmitted at each of the one or more communication rates on a step change basis from the quality assurance level to a maximum communication rate available in the wireless communication apparatus unless a communication error is detected within a predetermined fixed period of time determining a one step lower communication rate as an initial value of the communication rate when the communication error is detected, and determining the maximum communication rate as the initial value of the communication rate when no communication error is detected during the test wireless communication;

setting the communication rate to the initial value when the wireless communication is started for the streaming data; and changing a setting of the communication rate according to the radio signal propagation condition during the wireless communication by keeping the quality assurance level as the minimum communication rate, wherein a signal of the streaming data is modulated according to the communication rate, and transmitting the modulated streaming data.

7. The wireless communication method according to claim 6, wherein the changing a setting of the communication rate step includes:

adjusting the communication rate during the wireless communication for the streaming data by decreasing a setting level of the communication rate whenever a number of times of continuous occurrence of the communication error detected reaches a threshold value that is set in advance.

8. The wireless communication method according to claim 7, wherein the changing a setting of the communication rate step further includes:
incrementing a value of the threshold value and restoring the communication rate to the initial setting value when the number of times of continuous occurrence of the communication error detected reaches the threshold value under a condition that a current communication rate is being set to the quality assurance level.

9. The wireless communication method according to claim 8, wherein the changing a setting of the communication rate step further includes:
generating an alarm signal when a continued time of repeated communication errors exceeds or equals to a predetermined retransmission monitoring time under a condition that a current communication rate is being set to the quality assurance level.

10. The wireless communication method according to claim 8, wherein the changing a setting of the communication rate step further includes:
increasing a setting level of the communication rate when the communication rate is set to lower than the maximum level and the communication error is not detected within a predetermined period of time.

11. The wireless communication method according to claim 8, wherein the changing a setting of the communication rate step further includes:
increasing a setting level of the communication rate when the communication rate is set to lower than the maximum level and the communication error is not detected within a predetermined period of time.

12. A non-transitory computer readable recording medium having stored thereon a computer program for causing a wireless communication apparatus, which performs a wireless communication for streaming data by using one of a plurality of switchable communication rates provided in a wireless communication apparatus depending on a radio signal propagation condition, to execute:
a step of storing a data table which includes corresponding information about each of communication rates available in the wireless communication apparatus and a maximum value of data transfer rate of the streaming data whose transfer quality can be theoretically ensured by each communication rate thereof;
a step of searching the data table by using a specified target transfer rate of the streaming data as an index key and selecting one or more of the communication rates that ensure the transfer quality of the specified target transfer rate;
a step of specifying a quality assurance level which is the lowest communication rate among the selected one or more communication rates;
a step of performing a test wireless communication in which test streaming data having the same transfer rate as the specified target transfer rate of the streaming data to be transmitted is transmitted at each of the one or more communication rates on a step change basis from the quality assurance level to a maximum communication rate available in the wireless communication apparatus unless a communication error is detected within a predetermined fixed period of time;
a step of determining a one step lower communication rate as an initial value of the communication rate when the communication error is detected, and determining the maximum communication rate as the initial value of the communication rate when no communication error is detected during the test wireless communication;
a step of setting the communication rate to an initial setting value when the wireless communication is started for the streaming data;
a step of modulating a signal of the streaming data according to the communication rate for transmitting the streaming data; and
a step of changing a setting of the communication rate according to the radio signal propagation condition during the wireless communication by keeping the quality assurance level as the minimum communication rate.

13. The non-transitory computer readable recording medium with a computer program according to claim 12, to further execute in the step of changing a setting of the communication rate:
a step of adjusting the communication rate during the wireless communication for the streaming data by decreasing a setting level of the communication rate whenever a number of times of continuous occurrence of the communication error detected reaches a threshold value that is set in advance.

14. The non-transitory computer readable recording medium with a computer program according to claim 13, to further execute in the step of changing a setting of the communication rate:
a step of incrementing a value of the threshold value and restoring the communication rate to the initial setting value when the number of times of continuous occurrence of the communication error detected reaches the threshold value under a condition that a current communication rate is being set to the quality assurance level.

15. The non-transitory computer readable recording medium with a computer program according to claim 14, to further execute in the step of changing a setting of the communication rate:
a step of generating an alarm signal when a continued time of repeated communication errors exceeds or equals to a predetermined retransmission monitoring time under a condition that a current communication rate is being set to the quality assurance level.

16. The non-transitory computer readable recording medium with a computer program according to claim 14, to further execute in the step of changing a setting of the communication rate:
a step of increasing a setting level of the communication rate when the communication rate is set to lower than the maximum level and the communication error is not detected within a predetermined period of time.

* * * * *